United States Patent
Slater

(10) Patent No.: US 6,853,163 B2
(45) Date of Patent: Feb. 8, 2005

(54) ROTOR POSITION DETECTION OF A SWITCHED RELUCTANCE DRIVE

(75) Inventor: Howard James Slater, Harrogate (GB)

(73) Assignee: Switched Reluctance Drives Ltd., Harrogate (GB)

( * ) Notice: Subject to any disclaimer, the term of this patent is extended or adjusted under 35 U.S.C. 154(b) by 93 days.

(21) Appl. No.: 10/317,923

(22) Filed: Dec. 11, 2002

(65) Prior Publication Data

US 2003/0111975 A1 Jun. 19, 2003

(30) Foreign Application Priority Data

Dec. 18, 2001 (GB) .............................................. 0130237

(51) Int. Cl.$^7$ ................................................ H02P 1/18
(52) U.S. Cl. ....................... 318/700; 318/254; 318/701; 318/720; 318/721
(58) Field of Search ................................ 318/254, 700, 318/701, 720, 721

(56) References Cited

U.S. PATENT DOCUMENTS

| | | | | |
|---|---|---|---|---|
| 4,772,839 | A | * 9/1988 | MacMinn et al. | .......... 318/696 |
| 5,107,195 | A | * 4/1992 | Lyons et al. | ................ 318/701 |
| 5,469,039 | A | 11/1995 | Stephenson et al. | |
| 5,982,117 | A | * 11/1999 | Taylor et al. | ................ 318/254 |
| 6,153,956 | A | 11/2000 | Branecky | |
| 6,288,513 | B1 | * 9/2001 | Green | .......................... 318/700 |
| 6,288,514 | B1 | 9/2001 | Direnzo et al. | |
| 6,396,237 | B2 | * 5/2002 | Mayes | ......................... 318/701 |

FOREIGN PATENT DOCUMENTS

| | | |
|---|---|---|
| EP | 0573198 A1 | 12/1993 |
| EP | 0 573 198 B1 | 11/1996 |
| EP | 1 225 686 A2 | 7/2002 |
| WO | 91/02401 | 2/1991 |

OTHER PUBLICATIONS

Wolff, J., et al., "Sensorless Speed Control of a Switched Reluctance Motor for Industrial Applications," Optimization of Electrical and Electronic Equipments–Brasov 1998, vol. 2, pp. 457–462.

Stephenson, et al., "The Characteristics, Design and Applications of Switched Reluctance Motors and Drives," PCIM '93, Nürnberg, Germany, Conference & Exhibition. Jun. 21–24, 1993, pp. 1–68.

Mvungi, N.M., et al., "Accurate Sensorless Rotor Position Detection in an SR Motor," EPE Firenze, 1991, pp. 76–79.

Ray, W.F., et al.., "Sensorless Methods for Determining the Rotor Position of Switched Reluctance Motors," European Power Electronics Association. 1993. pp. 7–13.

* cited by examiner

Primary Examiner—Rina Duda
(74) Attorney, Agent, or Firm—Dicke, Billig & Czaja, PLLC

(57) ABSTRACT

A switched reluctance drive is controlled without using a physical rotor position detector. The control method estimates the standing flux-linkage associated with the phase and uses this estimate to improve its estimate of rotor position. The method works robustly regardless of whether the current is continuous or discontinuous.

25 Claims, 5 Drawing Sheets

ROTOR POSITION DETECTION OF A SWITCHED RELUCTANCE DRIVE

CROSS-REFERENCE TO RELATED APPLICATION

The subject matter of this application is related to the subject matter of British Application No. 0130237.1, filed Dec. 18, 2001, priority to which is claimed under 35 U.S.C. §119 and which is incorporated herein by reference.

BACKGROUND OF THE INVENTION

1. Field of the Invention

This invention relates to sensorless rotor position detection in reluctance machines, particularly in switched reluctance machines.

2. Description of Related Art

The control and operation of switched reluctance machines generally are described in the paper "The Characteristics, Design and Applications of Switched Reluctance Motors and Drives" by J. M. Stephenson and R. J. Blake, delivered at the PCIM'93 Conference and Exhibition held in Nürnberg, Germany, 21–24 June 1993, which paper is incorporated herein by reference. In that paper the "chopping" and "single-pulse" modes of energization of switched reluctance machines are described for operation of the machine at low and high speeds, respectively.

A typical prior art drive is shown schematically in FIG. 1. This includes a DC power supply 11 that can be either a battery or rectified and filtered AC mains. The DC voltage provided by the power supply 11 is switched across phase windings 16 of the motor 12 by a power converter 13 under the control of the electronic control unit 14. One of the many known converter topologies is shown in FIG. 2, where the power supply 11 is provided on supply rails 26, 27 which have a capacitor 25 connected across them to cater for any alternating components of current. The phase winding 16 is connected to the supply rails by an upper switch 21 and a lower switch 22. Energy return diodes 23, 24 are connected in conventional fashion. A resistor 28 is connected in series with the lower switch 22 to provide a current feedback signal. A multiphase system typically uses several of the "phase legs" of FIG. 2 connected in parallel to energize the phases of the electrical machine.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical, magnetic or other sensor mounted on the stator. A signal, e.g. a pulse train, indicative of rotor position relative to the stator is generated by the sensor and supplied to control circuitry, allowing accurate phase energization. This system is simple and works well in many applications. However, the rotor position transducer increases the overall cost of assembly. It also adds extra electrical connections to the machine and is, therefore, a potential source of unreliability.

Various methods for dispensing with the rotor position transducer have been proposed. Several of these are reviewed in "Sensorless Methods for Determining the Rotor Position of Switched Reluctance Motors" by W. F. Ray and I. H. Al-Bahadly, published in the Proceedings of The European Power Electronics Conference, Brighton, UK, 13–16 Sep. 1993, Vol. 6, pp 7–13, which is incorporated herein by reference.

Many of these methods proposed for rotor position estimation use the measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 3. The storage of this data is a disadvantage as it involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 4(a) in which the current and inductance waveforms are shown over a phase inductance period. (Note that the variation of inductance is depicted in idealized form.) These methods usually employ diagnostic pulses in non-torque-productive phases. A method suited to low-speed operation is that proposed by N. M. Mvungi and J. M. Stephenson in "Accurate Sensorless Rotor Position Detection in an S R Motor", published in Proceedings of the European Power Electronics Conference, Firenze, Italy, 1991, Vol. 1, pp 390–393, incorporated herein by reference.

Other methods operate in the "single-pulse" mode of energization at higher speeds. This mode is illustrated in FIG. 4(b) in which the current and inductance waveforms are shown over a phase inductance period. These methods monitor the operating voltages and currents of an active phase without interfering with normal operation. A typical higher speed method is described in International Patent Application WO 91/02401, incorporated herein by reference.

Having to store a two-dimensional array of machine data in order to operate without a position sensor is an obvious disadvantage. Alternative methods have been proposed, which avoid the need for the majority of angularly referenced information and instead store data at one angle only. One such method is described in European Patent Application EP-A-0573198 (Ray), incorporated herein by reference. This method aims to sense the phase flux-linkage and current at a predefined angle by adjusting the diagnostic point in accordance with the calculated deviation away from the desired point. Flux-linkage is estimated by integrating (with respect to time) the measurement of the voltage applied to the phase. Two one-dimensional tables are stored in one embodiment, one of flux-linkage versus current at a referenced rotor angle and another of the differential of flux-linkage with respect to rotor angle versus current. By monitoring phase voltage and current, the deviation away from a predicted angle can be assessed, with the aid of the look-up tables, and system operation can be adjusted accordingly. This method has been shown to be reliable, provided that the flux-linkage can be determined with sufficient accuracy whenever required by the position-detecting algorithm. To avoid the flux-linkage integrator drifting (due to unwanted noise in the system and imperfections in the integrator) it is set to zero at the end of each conduction cycle, when the current has fallen to zero and the phase winding is no longer linking any flux. This method is a "predictor/corrector" method, in that it initially predicts when the rotor will be at a reference position, measures parameters of the machine when it believes the reference position has been reached, and uses the results of these measurements to detect error in the prediction and hence take corrective action by adopting a new prediction for the next reference position.

A special mode of operation of switched reluctance machines is the continuous current mode, as disclosed in U.S. Pat. No. 5,469,039 (Ray), incorporated herein by reference. In this mode, the winding is re-connected to the supply before the flux, and hence the current, have returned to zero at the end of the energy return period. The phase windings therefore operate with current continuously flowing through them and are always linked by flux. This is an important mode for systems which have to produce high levels of overload output at some points of their operating cycle. Although the efficiency of the drive falls in this mode, it allows specifications to be achieved which would otherwise require a larger machine. However, in this mode it has not hitherto been possible to use any of the prior art methods for sensorless rotor position detection, as there is no opportunity in the phase cycle to reset the integrators at some known point of zero flux and current, since such a point does not exist.

Attempts to find a solution to this problem have included schemes which allow the drive to operate in the continuous current mode except when the control system judges it essential to re-estimate the position, at which time the continuous current mode is exited, the position estimated, and the drive put back into continuous current mode. Specifically, this can be done by running the machine in a mode which is predominantly continuous current but drops back into discontinuous current at predetermined intervals to allow positional information to be gained. The technique depends on the speed being virtually constant, which may be approximately true at higher speeds (at which continuous current is usually employed). Nevertheless, a loss of torque is associated with dropping out of continuous current. An alternative method is to operate each phase in continuous current for a given number of cycles, say 10, and then to excite the phase for a shorter time on the next cycle such that the current will definitely fall to zero, allowing the integrator to be reset and an accurate estimate of flux-linkage to be made. By interleaving this "short" cycle with the other phases operating in continuous current, the deleterious effect of the loss of torque is mitigated.

However, with all of these methods, the loss of torque can render the machine performance unstable, and several cycles are required before stability is reached again, because the current must be built up over a period in the continuous current.

SUMMARY OF THE INVENTION

According to an embodiment of the present invention there is provided a method of detecting rotor position in a reluctance machine, comprising: deriving a value for the flux linkage associated with the or at least one phase of the machine at a first point, at a moment at which voltage is applied to that phase; deriving a value of the phase current and the phase flux linkage at a subsequent point of the rotor; combining the derived flux linkage values to give a value of total flux linkage at the subsequent point; and deriving the rotor position from the phase current and the value of the total flux linkage.

According to one embodiment, there is provided a method in which the moment when voltage is applied to the phase is at the point when flux-linkage growth is initiated. The current at the said moment is e.g. substantially zero or non-zero.

According to one embodiment, the value of the flux linkage at the moment when voltage is applied to the phase is derived from the current at the said moment. For example, the flux linkage at the said moment is derived from the current and stored values of inductance for ordinates of current.

Embodiments of the invention are, therefore, particularly useful in the single-pulse mode of operation of a switched reluctance machine. Embodiments of the invention optionally use the value of current at the first point to derive the value of flux-linkage. When the current is discontinuous the zero current value gives rise to a zero value of flux-linkage. When the current is continuous the value of current optionally is used to derive the non-zero flux-linkage.

According to one embodiment, the flux-linkage from the said first point is derived by integrating the phase voltage from the said moment to the subsequent point. The said flux-linkage at the subsequent point may be derived by integrating the phase voltage from the said moment to the subsequent point. The rotor position may be derived from stored parameters having coordinates of phase current and flux-linkage.

The method of the invention according to one particular embodiment measures the current at turn-on of a phase winding when flux growth is initiated and uses this current value to index a table of inductance. The value of inductance provided by the table is then multiplied by the current to give an estimate of the standing flux-linkage in the phase. Also at turn-on, a flux-measuring integrator, which is set to zero, is put into integration mode. At a predetermined subsequent point, the value of flux-linkage provided by the integrator is added to the calculated value for standing flux-linkage, and the resulting total is used to determine rotor position.

Because the inductance is determined at switch turn-on, i.e. the initiation of flux growth in a phase inductance cycle, the method does not require large amounts of stored data. It is also robust in the presence of noise on the waveforms from which it deduces position.

Also according to an embodiment of the present invention there is provided a method in which rotor position is derived from values associated with each phase of a polyphase machine.

One embodiment of the present invention provides a robust and cost-effective method of monitoring rotor position and a rotor position detector, which can operate without a rotor position transducer in the single-pulse mode, with or without continuous current.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

The phase inductance cycle of a switched reluctance machine is the period of the variation of inductance for the, or each, phase, for example between maxima when the stator poles and the relevant respective rotor poles are fully aligned. One illustrative embodiment to be described uses a 2-phase switched reluctance drive in the motoring mode, but any phase number from one upwards optionally is used, with the drive in either motoring or generating mode.

Figure 1:
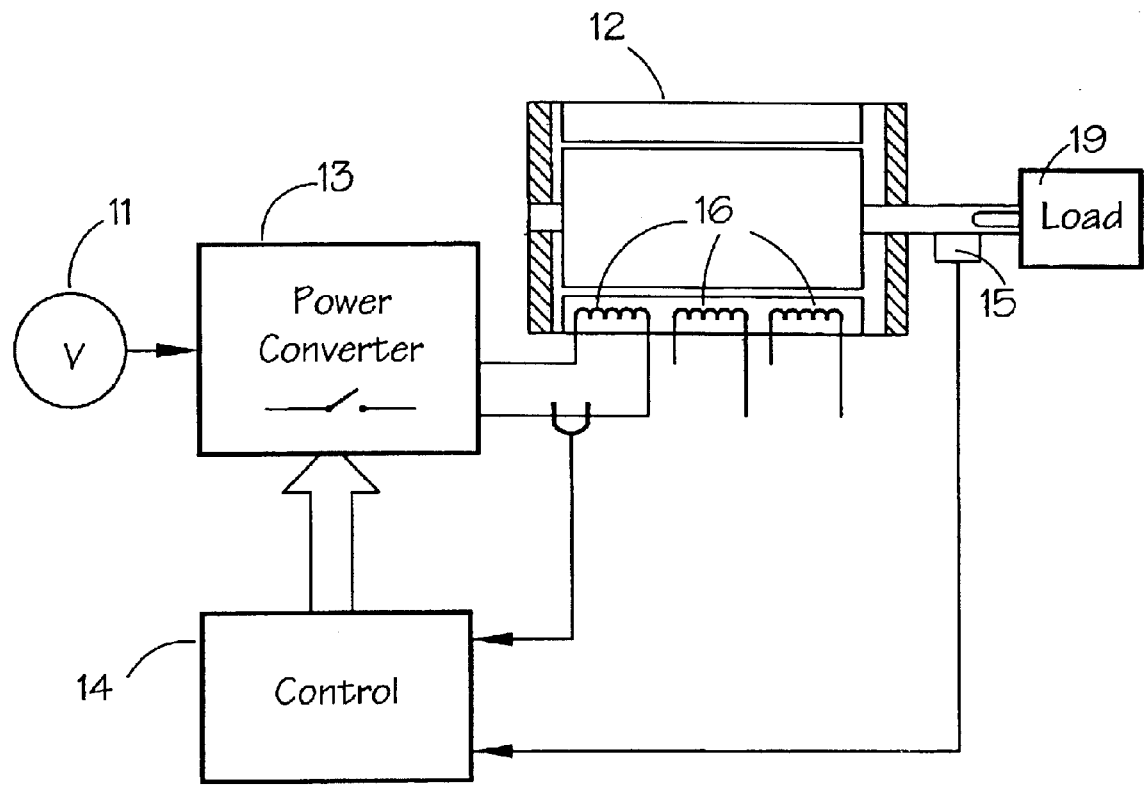
FIG. 1 shows a typical prior art switched reluctance drive.
Figure 2:
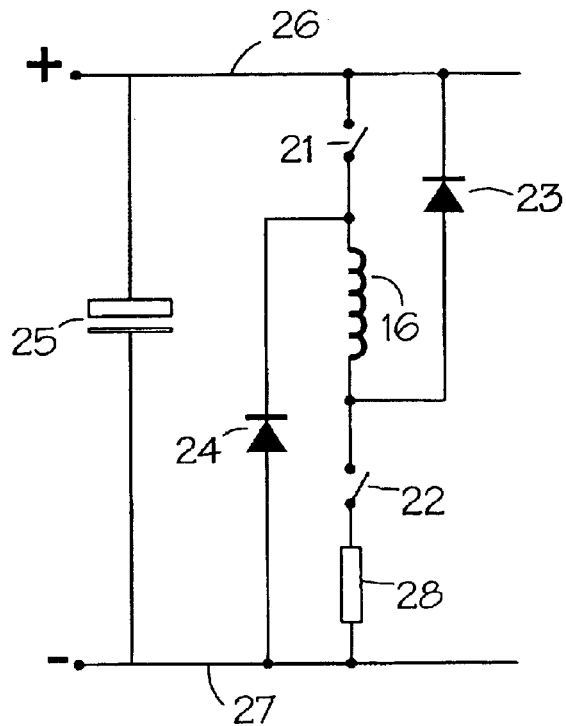
FIG. 2 shows a known topology of one phase of the converter of FIG. 1.
Figure 3:
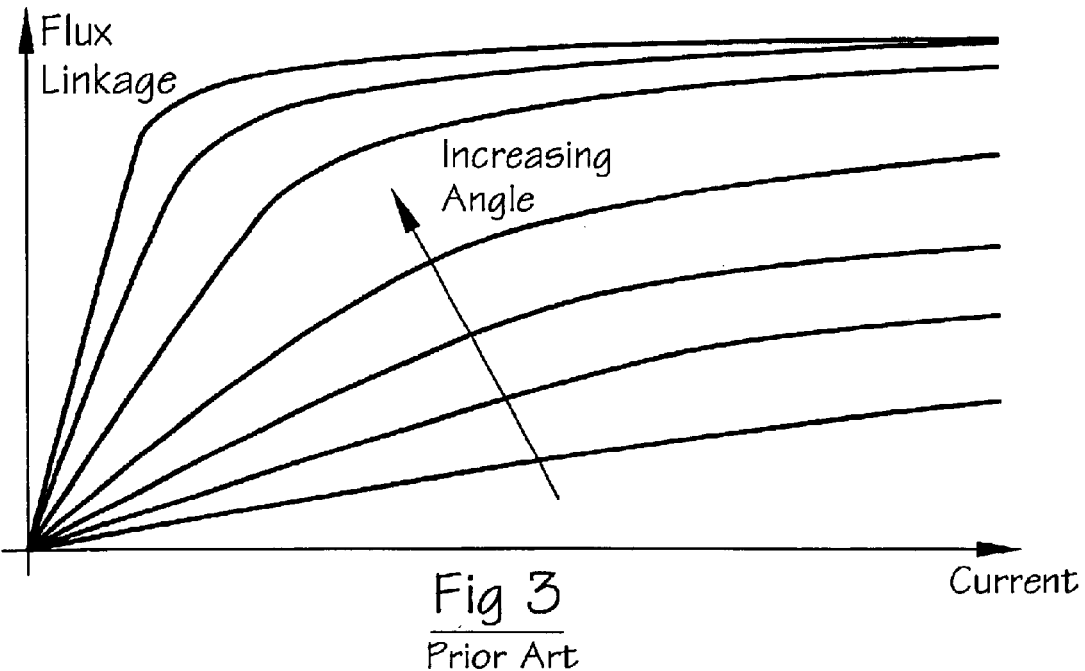
FIG. 3 shows typical flux-linkage and phase current curves, with rotor position as a parameter.
Figure 5:
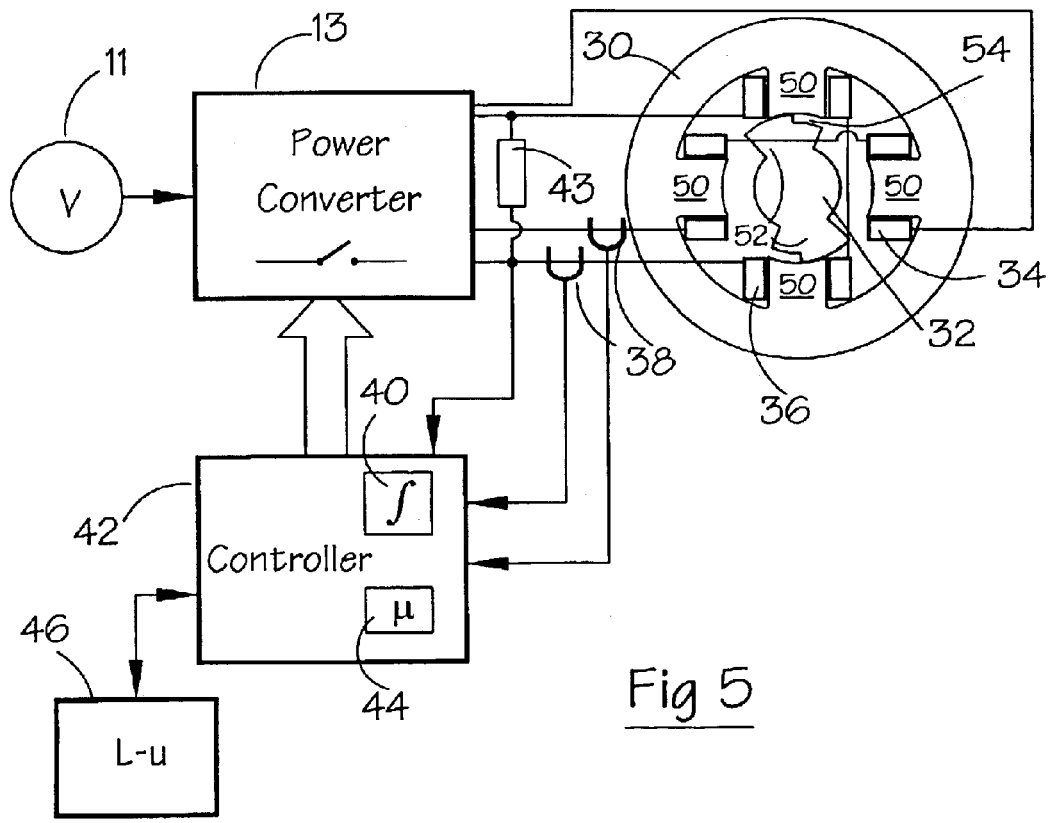
FIG. 5 shows in schematic form a switched reluctance drive, according to an embodiment of the invention.
Figure 7:
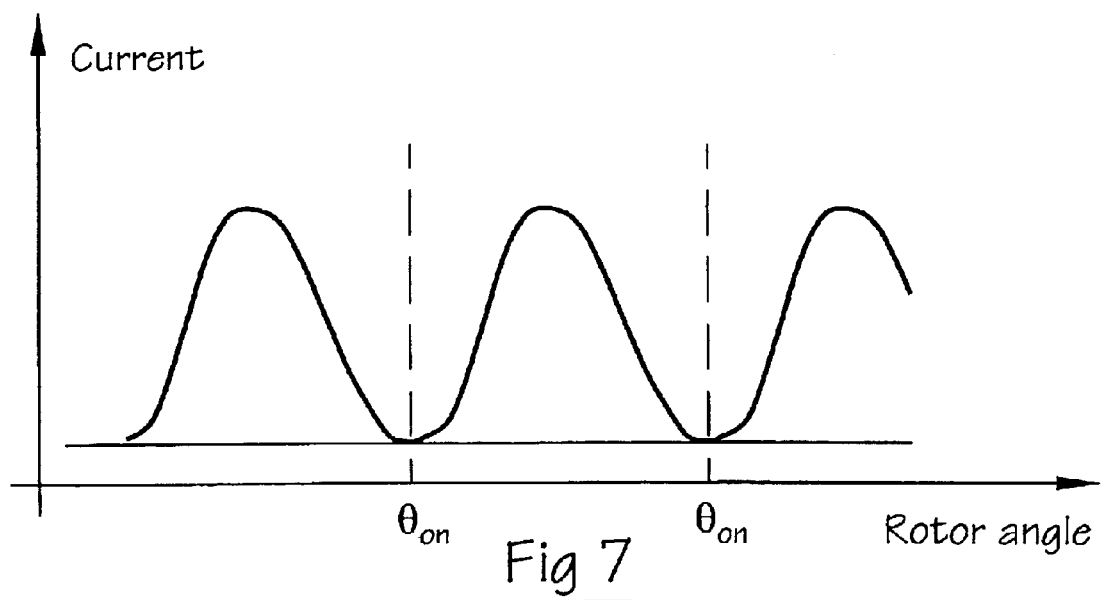
FIG. 7 shows a continuous current waveform for the drive of FIG. 5, according to an embodiment of the invention.

FIG. 5 shows a system for implementing a method according to an embodiment of the invention. FIG. 7 illustrates graphically the continuous current waveform for the system of FIG. 5. In this system, a power converter 13 optionally is the same as that shown in FIG. 1, and like reference numerals have been used where appropriate. The converter 13 controls the switched reluctance machine, as before. The converter 13 is itself controlled by a controller 42 which, in this embodiment, incorporates a digital signal processor 44, e.g. one from the Analog Devices 2181 family. Alternative embodiments optionally incorporate a microprocessor or other form of programmable device. The illustrated 2-phase machine has a stator 30 and a rotor 32. The stator has four poles 50, on which are wound phase windings 34/36. The rotor has rotor poles 52 and, to assist with starting the machine, has a pole face 54 that defines a stepped airgap with the face of a stator pole. One skilled in the art will realize that a machine with a different phase number or pole combinations optionally is used, since the invention is not necessarily specific to any particular machine topology. Similarly, embodiments of the invention are not necessarily restricted to a particular type of control technique, and any controller and converter optionally are used as long as they are suitably programmable.

Phase current is sensed by a current transducer 38 arranged in relation to each phase winding. The output signals indicative of current in each phase are fed to the controller 42. A look-up table 46 storing phase inductance for rotor angles is also connected with the controller 42. While a current transducer for each phase is shown, one or a selection of phases optionally is monitored for phase current according to embodiments of the invention.

An integrator 40 depicted in the controller 42 is used to derive measurements of flux by integrating the phase voltage V across the winding provided by voltage transducer 43. For greater accuracy the voltage drop (IR) across the winding optionally is factored out of the integrated value. Only one voltage transducer 43 is shown in FIG. 5, as the supply voltage will be common to each phase. It will be appreciated that each phase optionally has a respective voltage transducer. While the integrator is shown as a discrete device 40, it is optionally implemented in the software running in the processor 44.

A method according to an embodiment of the invention operates as follows. It is assumed that the machine is operating in continuous current mode and that the rotor position is known sufficiently well to allow the winding to be energized. At the point of turn on, when positive voltage is applied across the phase, the value of current is measured by the transducer 38 and held by the controller 42. Knowing the turn-on angle, the look-up table 46 of phase inductance against angle is interrogated to return the phase inductance corresponding to the rotor angle. The value of inductance is multiplied by the stored current value to give the flux-linkage in the phase at the point of turn on. This value is stored. As the rotor turns, the integrator 40 operates to integrate the voltage across the phase winding. When the control system determines that the subsequent predetermined position has been estimated to have been reached, the current is measured using the transducer 38 for the active phase and the estimate of flux linkage from the integrator 40 is added to the stored value from the table 46 to give the total value of flux linkage in the phase at that position. This total value is then used, in conjunction with the current, to find the true position which, if necessary, is used to correct the previous estimate.

The angular difference $\Delta\theta$ between the predicted rotor position $\theta_m$ and the reference rotor position $\theta_r$ is calculated by the processor 42 as $$\Delta\theta = \left\{\frac{\partial\theta}{\partial\psi_m}\right\} \cdot \Delta\Psi \tag{1}$$

In order to determine the angular difference between the predicted position (at which the measurement of flux and current is made) and the reference position, it is therefore also a feature of this embodiment to store in the processor for the reference position values of partial derivative $\partial\theta/\partial\psi$ (or its inverse $\partial\psi/\partial\theta$) for a set of values of phase current i.

Since the reference rotor position $\theta_r$ is known, the true rotor position at the predicted instant in time is calculated from $\Delta\theta$ e.g. as $$\theta_m = \theta_r + \Delta\theta \tag{2}$$

The expected time to the next rotor position then is estimated using the known value of motor speed. Under accelerating or decelerating conditions a correction may need to be made to the motor speed.

If all phases are used for measurement the next rotor reference position will be that for phase 2 (or whatever is the next phase in the sequence). For an n-phase motor with p rotor poles, the angle of rotation to this position will be $(360/np)°-\Delta\theta$ and, by dividing this angle by the speed, the time required to reach this next position is estimated.

If only one phase is used for measurement, the next rotor reference position will be after a rotation of $(360/p)°-\Delta\theta$ and, by dividing this angle by the speed, the time required to reach this position is estimated.

The predicted time to the next reference position is then counted out using a high frequency clock (not shown) by known means and at the instant such time has elapsed a further measurement of flux $\Psi_m$ and current $I_m$ is made for the corresponding phase. Due to changes in speed, and tolerances in stored data and calculations, the predicted position $\theta_m$ will not be identical to the reference position $\theta_r$. The angular difference $\theta_r - \theta_m$ again is calculated e.g. using equations (1) and (2) and the procedure outlined above.

The process of predicting rotor positions on a phase by phase basis and measuring the true rotor position at each measurement instant is repeated to provide an incremental indication of rotor position as a direct replacement for existing optical or electromagnetic rotor position sensors.

Figure 6:
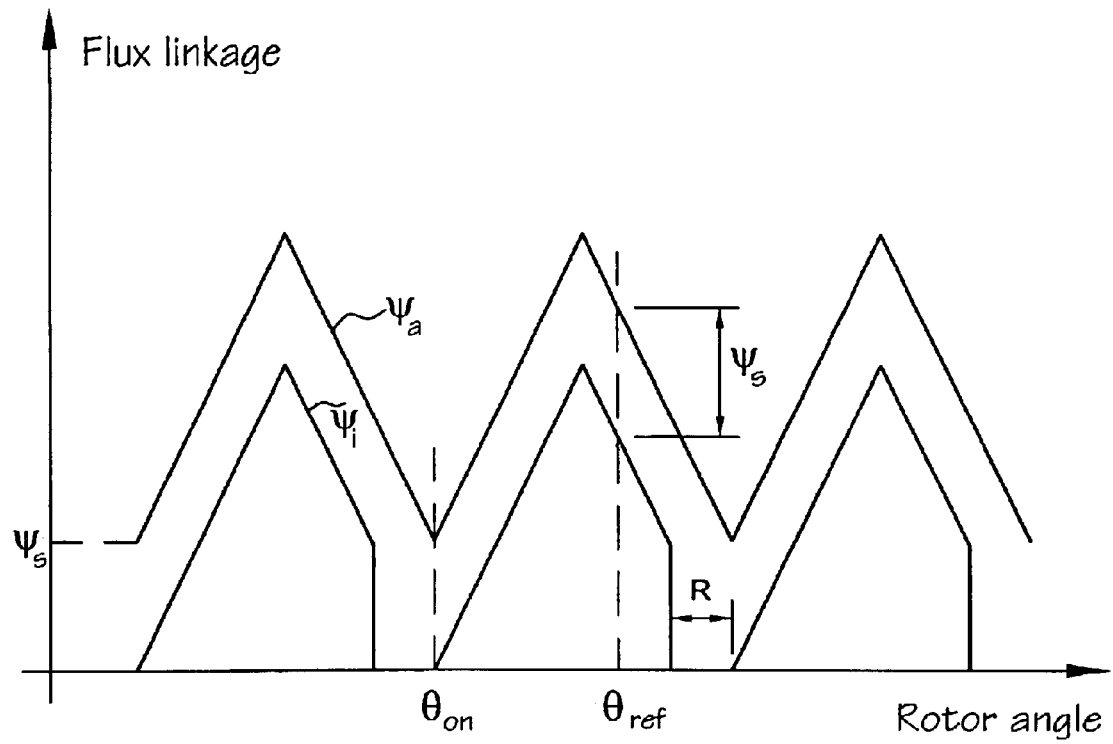
FIG. 6 shows flux-linkage waveforms in the drive of FIG. 5 in continuous current mode, according to an embodiment of the invention.

The procedure for the case of single-pulse operation under regenerating conditions is the same as described above except that the values of $\partial\theta/\partial\psi$ shown in FIG. 6 will be negative (rather than positive) for the corresponding typical reference rotor position.

Various arrangements optionally are used for the measurement of flux. Any known form of flux transducer optionally is used. However, the measurement is e.g. by means of analog or digital electronic resettable integrators (which integrate the phase voltage with respect to time t), together with means for compensating for the resistive voltage drop in the phase winding.

The integrator executes the equation:

$$\psi = \int_{t_o}^{t_m} (v - iR) dt \qquad (3)$$

where: v is the phase voltage
i is the phase current
R is the phase resistance
$t_m$ is the instant of measurement The integrator start time $t_o$ is arranged to be the instant of application of voltage to the phase each time the phase is energized (for the higher speed mode). The digital processor is informed of the instant of application of the voltage to the phase by the electronic controller using a control interface (not shown). The integrator is reset by the digital processor after each flux reading has been made.

In applications for which the direct source voltage V is relatively large compared to the voltage drop across the semiconductor switches in the power converter, the direct source voltage optionally is measured and integrated in place of the individual phase voltage. This has the advantage that only one voltage need be measured.

The flux is then measured as:

$$\psi = \int_{t_o}^{t_m} (V - iR) dt \qquad (4)$$

As an alternative to using separate electronic integrators, the digital processor is used e.g. by multiplying the direct supply (or phase) voltage by time on a step-by-step basis. This has the disadvantage that the digital processor is substantially busy and may need to be a separate unit.

However, provided the supply voltage is substantially constant and large compared with the resistive voltage iR, various approximations optionally are made. For example:

$$\psi_m = (V - k i_m R)(t_m - t_o) \qquad (5)$$

where k is a constant, typically k+0.5, such that:

$$k i_m (t_m - t_o) \approx \int_t^{t_m} i \, dt$$

As a further embodiment, in the case where the supply voltage V is relatively large compared with the resistive voltage iR, the need to compensate for the resistive voltage drop optionally is avoided by using a modified value for the flux in the stored data or ignoring iR altogether.

In this case the values of phase flux linkage $\psi$ for a particular current I and particular rotor position θ stored in the digital processor are replaced by values of the volt-second integral $\psi'$ required to create the phase current I for the rotor position θ are given by $$\psi' = \int v \, dt$$

Figure 4A:
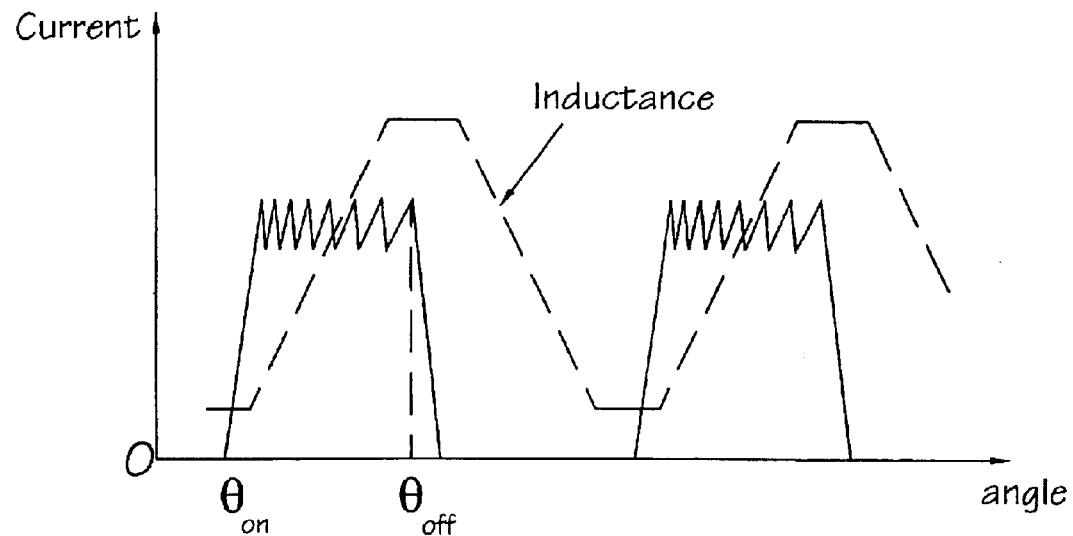
FIG. 4(a) shows a typical motoring current waveform in chopping control.
Figure 4B:
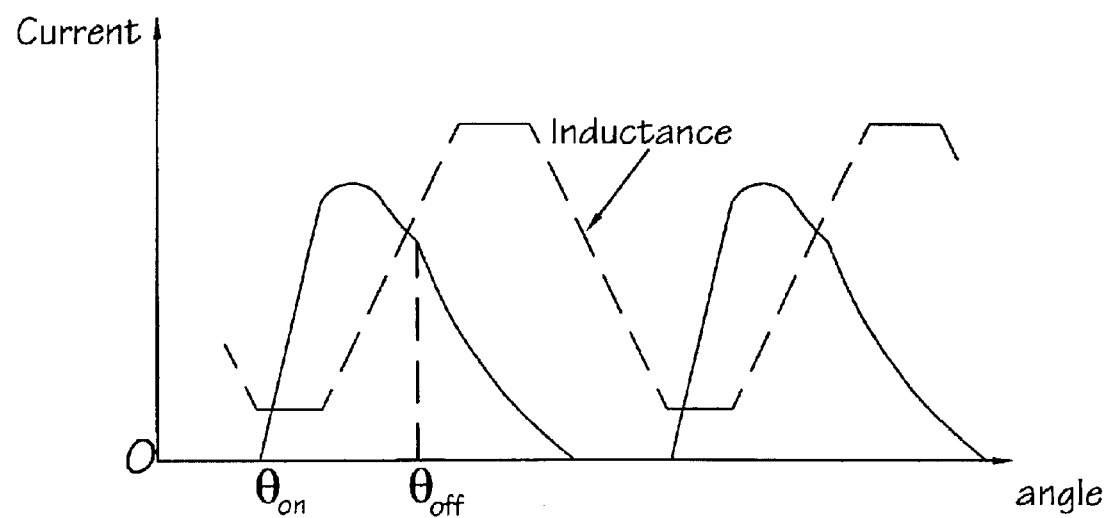
FIG. 4(b) shows a typical motoring current waveform in single-pulse control.

In testing the machine to establish the table of values of $\psi'$ and $\partial\theta/\partial\psi'$, v optionally is, for convenience, held constant (provided v is relatively large) and is e.g. equal to supply voltage. The rotor position measurement procedure is the same as already described in this application except that the measured flux $\psi_m$ and expected flux $\psi_e$ and partial derivative $(\partial\theta/\partial\psi)$ are replaced by $\psi'_m,\psi'_e$ and $(\partial\theta/\partial\psi')$ respectively, where $\psi'_e$ and $(\partial\theta/\partial\psi')$ are obtained as described from the stored data represented by FIGS. 4 and 6 and where the flux $\psi_m'$ is measured as $$\psi_m' = V(t_m - t_o) \qquad (6)$$

Equations (3), (4), (5) and (6) represent different methods of evaluating the phase flux linkage for the purpose of identifying rotor position and these represent different implementations of the technique.

The various embodiments described above are all based on the measurement of flux $\psi_m$ and current $I_m$ at a predicted rotor position, the look-up of the expected flux $\psi_e$ for the measured current $i_m$ corresponding to the reference rotor position, and the calculation of the difference Δθ between the reference rotor position and the predicted rotor position according to the equation:

$$\Delta\theta = \left\{ \frac{\partial\theta}{\partial\Psi_m} \right\} \cdot (\Psi_m - \Psi_e) \qquad (7)$$

FIG. 6 illustrates a method embodiment of the invention graphically. The saw-tooth waveform $\psi_a$ represents the actual flux linkage associated with a phase while the machine is in the continuous current mode. The flux-linkage value $\psi_s$ is the minimum, or "standing" value during the cycle. The saw-tooth waveform $\psi_i$ represents the flux linkage indicated by the output of the integrator. The phase is switched on at the angle $\theta_{on}$, prior to which the integrator has been held in reset for the period R by means of a signal from the processor 44. This period R is long enough to return the integrator output to zero. At $\theta_{on}$, the current is measured (see FIG. 7) and the look-up table 46 of inductance is interrogated to find the inductance of the phase for that rotor angle. The product of the current and the inductance is calculated by the processor 44. This gives an estimate of $\psi_s$, which is then stored by the controller 42. After $\theta_{on}$, the actual flux linkage in the phase increases at a rate dictated by the applied voltage, and is tracked, with an offset of $\psi_s$, by the output of the integrator. At some point (not critical to this discussion) the phase is switched off and the flux linkage begins to ramp down. When the control system determines that the rotor is at the predetermined position $\theta_{ref}$, the output from the integrator and the value of phase current are sampled and held. The stored estimate of $\psi_s$ is added to the value of $\psi_i$ to give an estimate of $\psi_a$. The current and $\psi_a$ are then used to find the actual rotor angle in the way described above and taught by Ray in EP-A-0573198.

Figure 8:
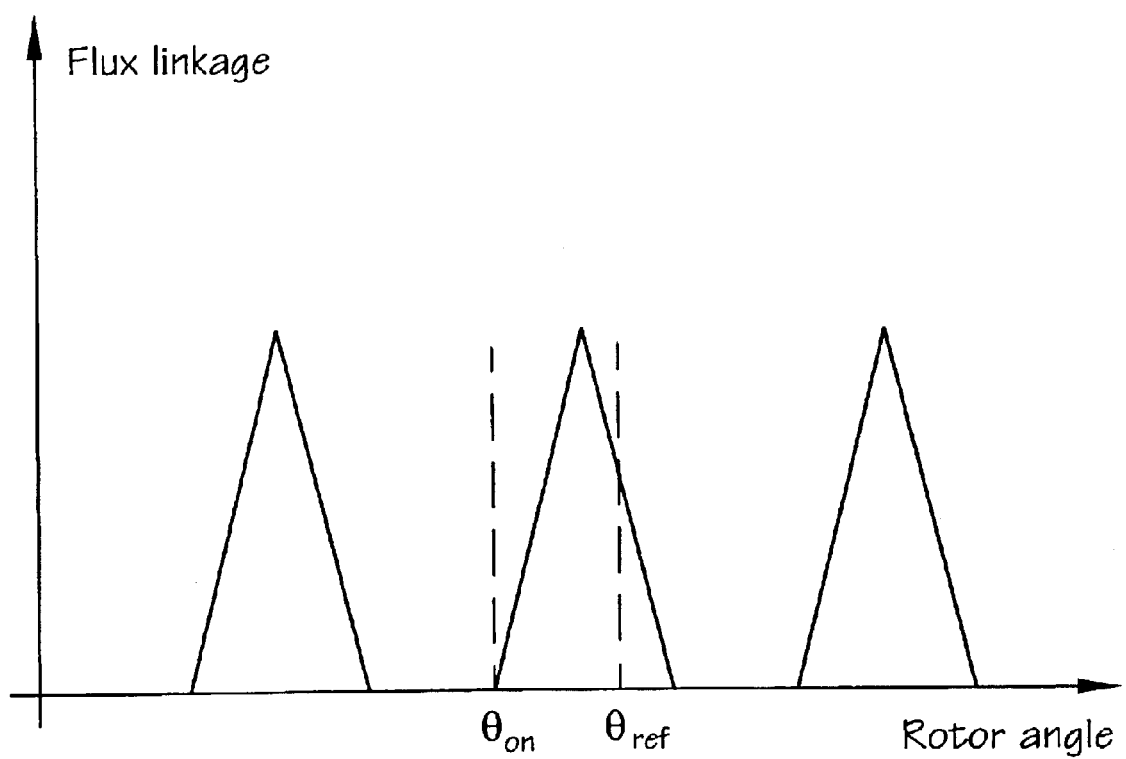
FIG. 8 shows flux-linkage waveforms in the drive of FIG. 5 in discontinuous current mode, according to an embodiment of the invention.

This embodiment of the invention is particularly advantageous in that it works equally well when the phase current is discontinuous, i.e. in the conventional single-pulse mode. This is illustrated graphically in FIG. 8. Since the current is zero immediately before $\theta_{on}$, the multiplication with the inductance value gives the correct result of zero standing flux-linkage. Thus, the same program code is useable in the controller 42 for both discontinuous and continuous current.

The method described above provides a simple, yet effective, way of combining continuous current operation with sensorless position detection, without any unwanted degradation in the performance of the machine.

The skilled person will appreciate that variations of the disclosed arrangements are possible without departing from the invention, particularly in the details of the implementation of the algorithm in the controller. Also, the diagnosis on which rotor position detection is based optionally is carried out in only one phase of a polyphase machine. Accordingly, the above description of several embodiments is made by way of example and not for the purposes of limitation. It will be clear to the skilled person that minor modifications can be made to the drive circuit without significant changes to the operation described above. The present invention is intended to be limited only by the scope of the following claims.

What is claimed is:

1. A method of detecting rotor position in a reluctance machine, comprising:
   deriving a value for flux linkage associated with the or at least one phase of the machine at a first point, at a moment at which application of voltage to that phase is initiated;
   deriving a value of phase current and flux linkage at a subsequent point in time;
   combining the derived flux linkage values to give a value of total flux linkage at the subsequent point; and
   deriving the rotor position from the phase current and the value of the total flux linkage.

2. A method as claimed in claim 1 in which the moment is at a point when flux-linkage growth is initiated.

3. A method as claimed in claim 1 in which the current at the said moment is non-zero.

4. A method as claimed in claim 1 in which the current at the said moment is zero.

5. A method as claimed in claim 1 in which the value of the flux linkage at the moment when voltage is applied to the phase is derived from the current at the said moment.

6. A method as claimed in claim 5 in which the flux linkage at the said moment is derived from the current and stored values of inductance.

7. A method as claimed in claim 1 in which the flux linkage at the said subsequent point is derived by integrating phase voltage from the said moment to the subsequent point.

8. A method as claimed in claim 7 in which the said moment is the point of minimum flux linkage and the integration is started at the said moment.

9. A method as claimed in claim 1 in which the rotor position is derived from stored parameters of phase current and flux linkage.

10. A method as claimed in claim 1 in which rotor position is derived from values associated with each phase of a polyphase machine.

11. A method as claimed in claim 1 in which the rotor position is derived from values associated with one phase of a polyphase machine.

12. A rotor position detector for a reluctance machine comprising:
    means for determining a value for flux linkage associated with the or at least one phase of the machine at a first point, at a moment when application of voltage to that phase is initiated;
    means for deriving a value of phase current and flux linkage at a subsequent point in time;
    means for combining the flux linkage values to give a value of total flux linkage at the subsequent point; and
    means for deriving the rotor position from the phase current and the value of total flux linkage.

13. A detector as claimed in claim 12 including a look-up table storing values of inductance for values of phase current.

14. A detector as claimed in claim 12 in which the means for deriving a value for the flux linkage at the subsequent point includes an integrator for integrating phase voltage from the said moment to the subsequent point.

15. A detector as claimed in claim 14 including means for resetting the integrator for the said moment.

16. A detector as claimed in claim 12, including processor means operable to determine the values for the flux linkage when flux-linkage growth is initiated.

17. A detector as claimed in claim 16 in which the processor means is operable to derive the value for the flux linkage from the current at the said moment.

18. A detector as claimed in claim 12 in which the means for deriving the rotor position includes means for scoring values of rotor position for values of phase current and flux linkage.

19. A detector as claimed in claim 13, in which the means for deriving the rotor position includes means for storing values of rotor position for values of phase current and flux linkage.

20. A detector as claimed in claim 14, in which the means for deriving the rotor position includes means for storing values of rotor position for values of phase current and flux linkage.

21. A detector as claimed in claim 15, in which the means for deriving the rotor position includes means for storing values of rotor position for values of phase current and flux linkage.

22. A detector as claimed in claim 16, in which the means for deriving the rotor position includes means for storing values of rotor position for values of phase current and flux linkage.

23. A detector as claimed in claim 17, in which the means for deriving the rotor position includes means for storing values of rotor position for values of phase current and flux linkage.

24. A method of detecting rotor position in a continuous current mode of a reluctance machine, comprising:
    deriving a value for flux linkage associated with the or at least one phase of the machine at a first point, at a moment at which application or voltage to that phase is initiated;
    deriving a value of phase current and flux linkage at a subsequent point in time;
    combining the derived flux linkage values to give a value of total flux linkage at the subsequent point; and
    deriving the rotor position from the phase current and the value of the total flux linkage;
    wherein the phase current and the flux linkage at the said moment are non-zero and the reluctance machine is operating in a continuous current mode.

25. A rotor position detector for a reluctance machine comprising:
    means for determining a value for flux linkage associated with the or at least one phase of the machine at a first point, at a moment when voltage is applied to that phase;
    means for deriving a value of phase current and phase flux linkage at a subsequent point;
    means for combining the derived flux linkage values to give a value of total flux linkage at the subsequent point;
    means for deriving the rotor position from the phase current and the value of total flux linkage; and
    processor means operable to determine the value for the flux linkage when flux-linkage growth is initiated;
    wherein the means for deriving the rotor position includes means for storing values of rotor position for values of phase current and flux linkage.

* * * * *